United States Patent
Peng

(10) Patent No.: US 11,777,889 B2
(45) Date of Patent: Oct. 3, 2023

(54) INFORMATION PROCESSING METHOD AND DEVICE AND ELECTRONIC EQUIPMENT

(71) Applicant: BEIJING BYTEDANCE NETWORK TECHNOLOGY CO., LTD., Beijing (CN)

(72) Inventor: Longteng Peng, Shenzhen (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/877,433

(22) Filed: Jul. 29, 2022

(65) Prior Publication Data

US 2022/0368664 A1    Nov. 17, 2022

Related U.S. Application Data

(63) Continuation of application No. PCT/CN2021/108498, filed on Jul. 26, 2021.

(30) Foreign Application Priority Data

Jul. 28, 2020 (CN) .................. 202010740874.6

(51) Int. Cl.
 G06F 15/16 (2006.01)
 H04L 51/224 (2022.01)
 H04L 51/04 (2022.01)

(52) U.S. Cl.
 CPC ............ *H04L 51/224* (2022.05); *H04L 51/04* (2013.01)

(58) Field of Classification Search
 CPC ... H04L 51/224; H04L 51/04; H04L 12/1827; H04L 12/1813
 See application file for complete search history.

(56) References Cited

U.S. PATENT DOCUMENTS

2011/0010640 A1   1/2011  Fox et al.
2011/0264745 A1* 10/2011  Ferlitsch ............. G06Q 10/109
                                                        709/204

(Continued)

FOREIGN PATENT DOCUMENTS

CN      101141334 A    3/2008
CN    2015067732 A1    5/2015

(Continued)

OTHER PUBLICATIONS

International Search Report dated Nov. 2, 2022 in International Patent Application No. PCT/CN2020/108498.

*Primary Examiner* — John B Walsh

(57) ABSTRACT

An information processing method, an information processing apparatus and an electronic device are provided. The method includes: acquiring, in response to receiving of an acquisition request to announcement information of a chat group transmitted from a user, a document identification corresponding to the announcement information, where the document identification is associated with an online document recording the announcement information; acquiring an online document indicated by the document identification based on the document identification; and displaying the online document. The announcement information can be recorded by the online document, thereby improving the capability of collecting and collating the announcement information and thus improving user experience.

27 Claims, 5 Drawing Sheets

(56) References Cited

U.S. PATENT DOCUMENTS

2014/0172997 A1* 6/2014 Chan ..................... H04L 51/04
                                                709/206
2015/0150105 A1* 5/2015 Takegawa ........... H04L 12/1822
                                                726/7

FOREIGN PATENT DOCUMENTS

| CN | 108924038 A | 11/2018 |
| CN | 109510754 A | 3/2019 |
| CN | 109660447 A | 4/2019 |
| CN | 109918345 A | 6/2019 |
| CN | 110191131 A | 8/2019 |
| CN | 111177734 A | 5/2020 |
| CN | 111953502 A | 11/2020 |

* cited by examiner

INFORMATION PROCESSING METHOD AND DEVICE AND ELECTRONIC EQUIPMENT

CROSS REFERENCE OF RELATED APPLICATION

The present application is continuation application of PCT international patent application PCT/CN2021/108498, filed on Jul. 26, 2021 which claims the priority to Chinese Patent Application No. 202010740874.6, titled "INFORMATION ANNOUNCEMENT METHOD, APPARATUS AND ELECTRONIC DEVICE", filed on Jul. 28, 2020 with the State Intellectual Property Office of the PRC, both of which are incorporated herein by reference in their entireties.

FIELD

The present disclosure relates to the technical field of internet, and in particular to an information processing method, an information processing apparatus and an electronic device.

BACKGROUND

Information can be transmitted in a timely manner over a network in the Instant Messaging (IM). In some application scenarios, the instant messaging can support information transmission between multiple persons. That is, a creator may create a communication chat group based on the instant messaging, and invites related persons to participate in the chat group, thereby facilitating communication between multiple persons. When the chat group is created successfully, a chat group member may release announcement information, so that other chat group members know events corresponding to the announcement information. Other chat group members may acquire and browse the announce information.

SUMMARY

This section is provided to introduce the concept briefly, and the concept is described in detail in specific embodiments hereinafter. This section is neither intended to identity key features or necessary features of the claimed technical solutions, nor intended to limit scope of the claimed technical solutions.

An information processing method, an information processing apparatus and an electronic device are provided according to embodiments of the present disclosure.

In a first aspect, an information processing method is provided according to embodiments of the present disclosure. The method includes: acquiring, in response to receiving of an acquisition request to announcement information of a chat group transmitted from a user, a document identification corresponding to the announcement information, where the document identification is associated with an online document recording the announcement information; acquiring the online document indicated by the document identification based on the document identification; and displaying the online document.

In a second aspect, an information processing method is provided according to embodiments of the present disclosure. The method includes: transmitting, according to an association relationship between pre-stored document identifications and chat group identifications, a document identification corresponding to a chat group to a terminal device, in response to receiving of a first acquisition request for acquiring the document identification corresponding to the chat group which is generated in response to the acquisition request to the announcement information of the chat group from the user and is transmitted by the terminal device, where the first acquisition request is generated in response to an acquisition request to announcement information of the chat group from a user, where the first acquisition request includes the chat group identification of the chat group; and transmitting, in response to receiving of the document identification transmitted from the terminal device, an online document indicated by the document identification to the terminal device, so that the terminal device displays the online document, where the document identification is associated with the online document recording the announcement information.

In a third aspect, an information processing apparatus is provided according to embodiments of the present disclosure. The apparatus includes: a first acquisition module, configured to acquire, in response to receiving of an acquisition request to announcement information of a chat group transmitted from a user, a document identification corresponding to the announcement information, where the document identification is associated with an online document recording the announcement information; a second acquisition module configured to acquire the online document indicated by the document identification based on the document identification; and a display module, configured to display the online document.

In a fourth aspect, an information processing apparatus is provided according to embodiments of the present disclosure. The apparatus includes: a first transmitting module, configured to transmit, according to an association relationship between pre-stored document identifications and chat group identifications, a document identification corresponding to a chat group to a terminal device, in response to receiving of a first acquisition request for acquiring the document identification corresponding to the chat group which is transmitted by the terminal device and is generated in response to the acquisition request to the announcement information of the chat group from a user, where the first acquisition request includes a chat group identification of the chat group; and a second transmitting module, configured to transmit the online document indicated by the document identification to the terminal device in response to receiving of the document identification transmitted by the terminal device, so that the terminal device displays the online document, where the document identification is associated with an online document recording the announcement information.

In a fifth aspect, an electronic device is provided according to embodiments of the present disclosure. The electronic device includes: one or more processors; and a storage apparatus storing one or more programs. The one or more programs, when being executed by the one or more processors, cause the one or more processors to implement the information processing method according to the first aspect or the second aspect.

In a sixth aspect, a computer readable medium storing computer programs is provided according to embodiments of the present disclosure. The computer programs are executed by a processor to implement the information processing method according to the first aspect or the second aspect.

According to the information processing method, the information processing apparatus and the electronic device according to the embodiments of the present disclosure, in response to receiving of an acquisition request to announcement information of a chat group transmitted from a user, a document identification corresponding to the announcement information is acquired. The document identification is associated with an online document recording the announcement information. Then, the online document indicated by the document identification is acquired based on the document identification. Finally, the online document is displayed. The corresponding announcement information can be recorded by the online document, thereby improving the capability of collecting and collating the announcement information, and thus improving user experience.

BRIEF DESCRIPTION OF THE DRAWINGS

With reference to the drawings and specific embodiments below, the above and other features, advantages and aspects of the present disclosure become more apparent. Throughout the drawings, the same or similar reference numerals indicate the same or similar elements. It should be understood that the drawings are schematic, and components and elements are unnecessarily drawn in scale.

DETAILED DESCRIPTION

Figure 1:
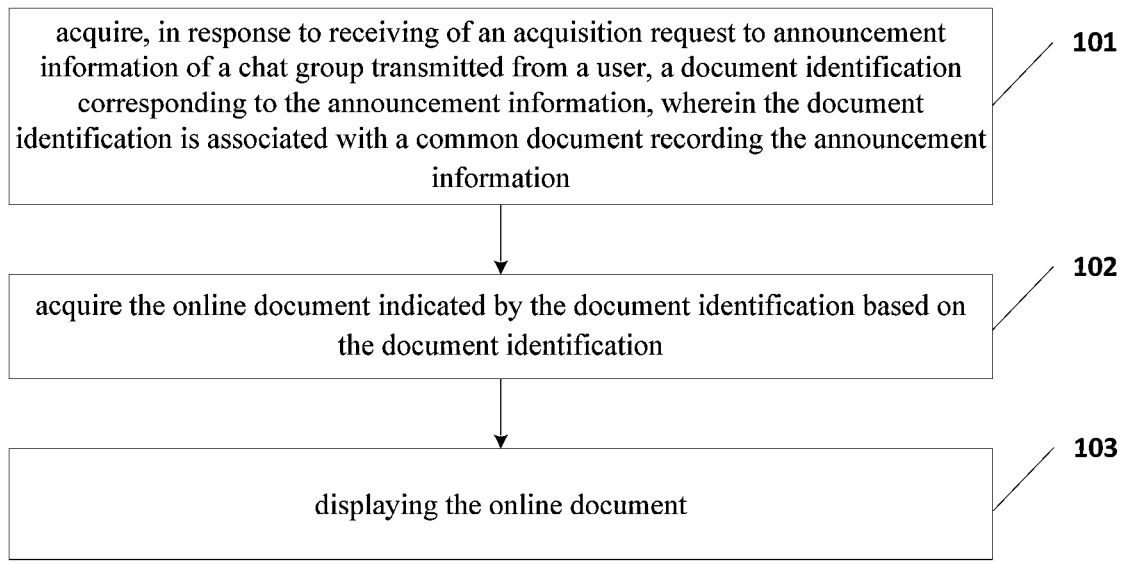
FIG. 1 is a flowchart of an information processing method according to an embodiment of the present disclosure.

Embodiments of the present disclosure are described in detail hereinafter with reference to the drawings. Although the drawings show some embodiments of the present disclosure, it should be understood that the present disclosure may be implemented by various embodiments and are not limited to be implemented by the embodiments clarified herein. The embodiments described in the present disclosure are intended to illustrate the present disclosure thoroughly and completely. It should be understood that the drawings and the embodiments are only schematic, and are not intended to limit the protection scope of the present disclosure.

It should be understood that, steps described in the embodiments of the present disclosure may be performed in different orders and/or performed in parallel. In addition, the method embodiments may include additional steps and/or steps omitted. The scope of the present disclosure is not limited thereto.

The term "including" and variations thereof adopted herein is inclusive, that is "including but not limited to". The term "based on" means "at least partially based on". The term "one embodiment" means "at least one embodiment", and the term "another embodiment" means "at least another embodiment". The term "some embodiments" means "at least some embodiments". Definitions of other terms are provided below.

It should be noted that, the terms "first" "second" and so on mentioned in the present disclosure are only used to distinguish different apparatuses, modules or units, rather than limit an order of functions performed by the apparatus, module or unit or limit interdependence.

It should be noted that, the terms "one" and "multiple" mentioned in the present disclosure are schematic rather than restrictive, and should be understood as "one or more" by those skilled in the art, otherwise explicitly illustrated in the context.

Names of messages or information interacted between multiple apparatuses in the embodiments of the present disclosure are illustrative rather than limit the scope of the message or information.

It should be noted that, embodiments of the present disclosure and features in the embodiments may be combined without a conflict.

The present disclosure involves an interaction system including a terminal device and a server.

The terminal device described above may include a tablet computer, a mobile communication device, a desktop computer or any other computing device which may acquire and display announcement information. Clients installed in the terminal device may be a browser or an application program. A user may achieve the function of acquiring and displaying the announcement information through the browser or the application program.

The above server may be a device providing service for the terminal device, for example a Web server. The Web server may provide a document identification corresponding to a chat group identification to a Web client such as the browser, and may also provide an online document according to the document identification transmitted by the terminal device. When an acquisition request for acquiring a document identification transmitted by the terminal device is received, the server may determine a document identification corresponding to the acquisition request in response to the acquisition request. When an acquisition request for acquiring an online document indicated by the document identification transmitted by the terminal device is received, the server transmits the corresponding online document. The online document herein may include an electronic document recording announcement information, for example an electronic document in which announcement information is edited by a word editing application program (such as word). The electronic document may be edited and displayed on multiple terminal devices by services provided by the server.

In the above interaction system, when an acquisition request to announcement information of a chat group transmitted from a user is received, the terminal device transmits an acquisition request for acquiring a document identification corresponding to the announcement information to the server. After the acquisition request is received, the server may transmit a corresponding document identification to the terminal device. After the document identification is received, the terminal device may store the document identification. In addition, the terminal device transmits the document identification to the server, and instructs the server to transmit an online document indicated by the document identification. Here, the server may create the online document indicated by the document identification in advance. In this case, when the document identification transmitted by the terminal device is received, the server can search for the online document indicated by the document identification. After the server transmits the corresponding online document to the terminal device, the terminal device can display the received online document. A user can browse announcement information recorded on the displayed online document. The terminal device and the server work cooperatively, and the announcement information is recorded by the online document, thereby improving the capability of collecting and collating the announcement information.

Reference is made to FIG. 1 which shows a flowchart of an information processing method according to an embodiment of the present disclosure. The method is applied to a terminal device. As shown in FIG. 1, the information processing method includes the following steps 101 to 103.

In step 101, in response to receiving of an acquisition request to announcement information of a chat group transmitted from a user, a document identification corresponding to the announcement information is acquired. The document identification is associated with an online document recording the announcement information.

In some scenarios, persons related to a certain event create a communication chat group, so as to facilitate communication among multiple persons. The communication chat group here may include a colleague chat group for work communication, a friend chat group for communication between friends, or a customer chat group for commodity selling. In another scenario, if persons in the communication chat group relate to multiple chatting applications under a same suite (a set of multiple associated products), related information of products in the suite may be synchronized in the created communication chat group. For example, a product A and a product B belong to a same suite, and the two products share one account system. That is, the product A and the product B can be logged with the same account information. In this way, actions performed on the product A by the user can be checked through the product B, and actions performed on the product B by the user can be checked through the product A.

After the communication chat group is successfully created, announcement information of the communication chat group may be recorded. The announcement information herein may include notification information for notifying other chat group members, introduction information of the communication chat group and other information which may be well known for the chat group members. The notification information here may include: "please check document A, all members" and "please plan function B, ZHANG San and LI Si". The introduction information herein may include "this chat group is a chat group for discussing search and development of product XXX".

The user may acquire the announcement information of the communication chat group to browse the announcement information displayed in the chat group. After receiving the acquisition request to the announcement information of the chat group transmitted from the user, the terminal device may generate an acquisition request for a document identification corresponding to the announcement information in response to the acquisition request, to acquire a corresponding document identification. The document identification is used for exclusively identifying a corresponding online document and has uniqueness. For example, for an online document A, a corresponding document identification may be "a123". In this way, when "a123" is found, it can be known that an online document corresponding to "a123" is the online document A.

The online document may be a cloud document. The cloud document refers to document resources stored in various network disks. A user with editing authority may open the cloud document in the network disk for editing at any time. After receiving the acquisition request for acquiring the document identification, the server may transmit a document identification to which a created online document is associated in advance to the terminal device. In some application scenarios, after receiving the document identification, the terminal device may store the document identification and the chat group in an association manner. In this way, after the acquisition request to the announcement information of the chat group transmitted from the user is received for the first time, it is necessary to acquire the document identification from the server; and subsequently, the document identification can be acquired on the terminal device, thereby being convenient and quick.

In step 102, an online document indicated by the document identification is acquired based on the document identification.

The terminal device may transmit the acquired document identification to the server, and instruct the server to transmit a corresponding online document. After receiving the document identification, the server may search for and transmit a corresponding online document based on the document identification. For example, an online document B recording the announcement information and a document identification "b123" associated with the online document B are stored in advance in the server. After receiving the document identification "b123" transmitted by the terminal device, the server may search for the document B and transmit the document B to the terminal device.

In some application scenarios, if the terminal device stores a document identification, the corresponding document identification is transmitted to the server when the acquisition request to the announcement information of the chat group transmitted from the user is received, and the server is instructed to transmit the online document indicated by the document identification, thereby simplifying the operation process and improving a response speed.

In step 103, the online document is displayed.

The terminal device may display the online document to the user when acquiring the online document. The user may browse the online document and edit the displayed online document. Since the online document may include an electronic document, information such as bold text and inserted content which can be displayed in the electronic document may be displayed to the user. For example, for underlined announcement information "hold a meeting on Monday", the user may browse corresponding information "hold a meeting on Monday". For announcement information of which content is a white cloud picture, the user may browse corresponding white cloud picture information.

In the conventional technology, for each piece of announcement information of the chat group, only limited word information can be edited generally, and thus only limited information can be carried. When the user announces the information, a next piece of announcement information is needed to be edited if the content of a current piece of announcement information exceeds information carrying capacity. Also, multiple pieces of announcement information needs to be integrated, resulting in bad experience for the user.

In some optional embodiments, the information processing method further includes: displaying user information of another user who is browsing/editing the online document on-line.

The user and the another user are chat group members of the chat group corresponding to the announcement information.

The online document is displayed in the chat group, the user of the chat group may browse and/or edit the online document. Multiple chat group users can browse/edit the online document on-line in a same time period. The multiple chat group users can browse the online document simultaneously.

In some optional embodiments, multiple chat group users can edit the online document on-line, thereby improving the efficiency of working cooperatively.

In the embodiment, in response to receiving of the acquisition request to the announcement information of the chat group transmitted from the user, the document identification corresponding to the announcement information is acquired. The document identification is associated with an online document recording the announcement information. The online document indicated by the document identification is acquired based on the document identification. Finally, the online document is displayed. The announcement information can be recorded by the online document, thereby improving the capability of collecting and collating the announcement information, and thus improving the user experience.

In some optional embodiments, before step 101, the information processing method may further include step 100: transmitting, in response to receiving of a chat group creation request for creating a chat group, a document creation request for creating an online document for the chat group to the server, to instruct the server to create an online document corresponding to the chat group and generate a document identification indicating the online document; and storing a chat group identification of the chat group and the document identification in an association manner in a preset storage region.

The terminal device may receive the chat group creation request transmitted by the user. The chat group creation request may include information of corresponding persons, and thus the terminal device may create a communication chat group including the corresponding persons in response to the chat group creation request. For example, the user instructs to create a communication chat group including the user, ZHANG San, LI Si and WANG Wu. After receiving the chat group creation request, the terminal device may create a corresponding communication chat group A, and set the user, ZHANG San, LI Si and WANG Wu to be chat group members of the communication chat group A.

In some scenarios, the terminal device may generate a document creation request corresponding to the chat group in response to the received chat group creation request, and transmits the document creation request to the server. After receiving the document creation request, the server may create one or more online documents corresponding to the chat group. In addition, the server may generate a chat group identification of the chat group, so that the chat group identification and the document identification are stored in an association manner in the preset storage region, and thus the chat group is associated with the online document. For example, when the communication chat group A is successfully created, a corresponding chat group identification "A123456" may be generated. In addition, when a corresponding online document a is created, a document identification "a123456" of the online document a is generated. The chat group identification "A123456" and the document identification "a123456" are stored in an associated manner in the preset storage region. In this way, one of the chat group identification and the document identification can be searched based on the other of the chat group identification and the document identification. The preset storage region herein may include a database, a cloud disk, and so on.

When the chat group creation request is received, a request for creating the online document corresponding to the chat group is transmitted to the server, so that the user can edit corresponding announcement information in the online document after participating in the chat group, thereby simplifying the operation.

In some optional embodiments, before step 101, the information processing method may include step 100': transmitting, in response to receiving of a request for recording announcement information from a chat group member of the chat group, a document creation request for creating an online document to the server, to instruct the server to create an online document corresponding to the chat group and generate a document identification indicating the online document; and storing a chat group identification of the chat group and the document identification in an association manner in the preset storage region.

In some application scenarios, a document creation request corresponding to the chat group may be generated when the chat group is successfully created and the request for recording the announcement information from the chat group member of the chat group is received, and the document creation request is transmitted to the server. After receiving the document creation request, the server may create one or more online documents corresponding to the chat group. In addition, a chat group identification of the chat group may be generated, so that the chat group identification and the document identification are stored in an association manner in the preset storage region, and thus the chat group is associated with the online document.

In practice, although the chat group is created, the chat group member does not need to record the announcement information. That is, the corresponding online document is created when the chat group is created; if the user does not record announcement information in the online document, the server stores an empty online document, and thus occupying memory of the server. Therefore, the corresponding online document may be created when the chat group member requests to record the announcement information for the first time, thereby avoiding occupying of memory of the server.

In some optional embodiments, step 101 may include step 1011: transmitting a first acquisition request for acquiring a document identification to the server, to instruct the server to acquire the document identification from the preset storage region. The first acquisition request includes the chat group identification of the chat group.

When the online document is successfully created, the user may acquire a corresponding online document to browse announcement information recorded in the online document. The terminal device may generate the first acquisition request when receiving the acquisition request to the announcement information of the chat group transmitted from the user. When receiving the first acquisition request, the server may search, based on the chat group identification included in the first acquisition request, the preset storage region for a document identification corresponding to the chat group identification, and transmit the acquired document identification to the terminal device. For example, for the chat group identification "A123456" and the document identification "a123456" stored in an association manner in the preset storage region, if the first acquisition request received by the server includes the chat group identification "A123456", the corresponding document identification "a123456" can be acquired; and the document identification "a123456" is transmitted to the terminal device. That is, the terminal device acquires the document identification "a123456" corresponding to the chat group A.

In some optional embodiments, the information processing method further includes: shielding a portal for sharing the announcement information in a display interface of the announcement information of the chat group.

In some optional embodiments, the announcement information of the chat group includes the online document which cannot be shared with other persons, thereby protecting privacy of the announcement information in the chat group.

Figure 2:
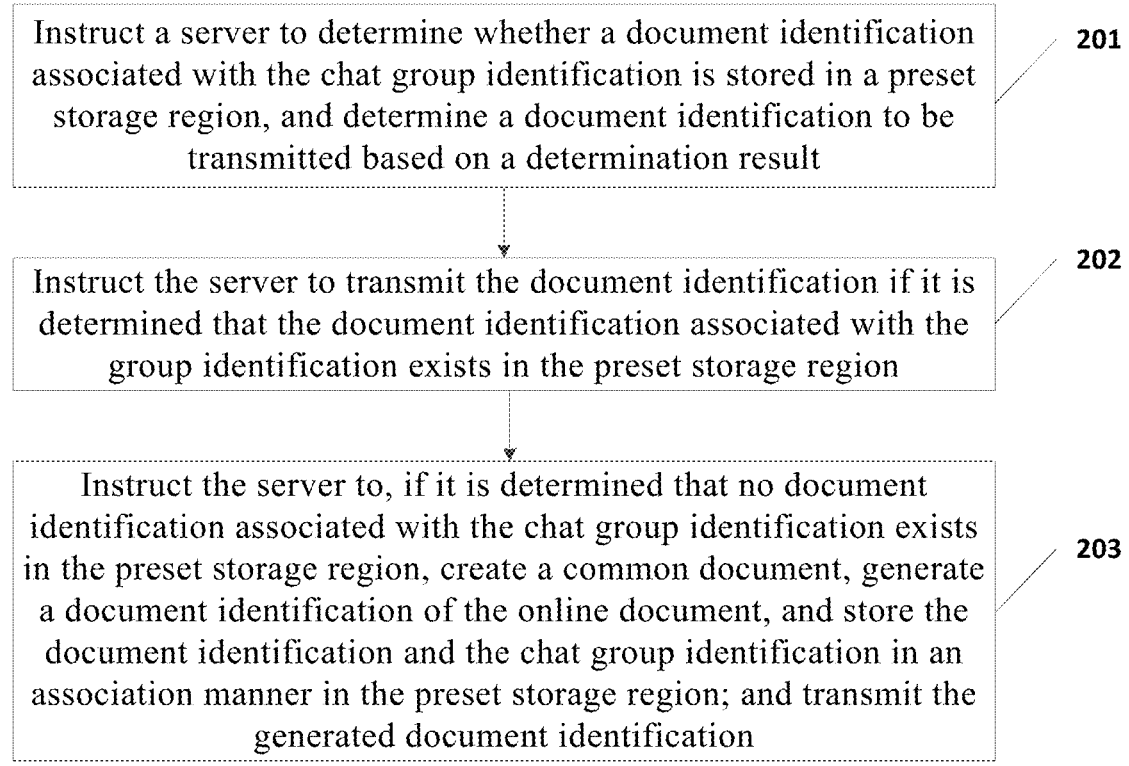
FIG. 2 is a schematic flowchart showing acquiring of a document identification according to an embodiment of the present disclosure.

FIG. 2 is a schematic flowchart showing acquiring of a document identification according to an embodiment of the present disclosure. As shown in FIG. 2, in some optional embodiments, step 1011 may include substep 201, instructing the server to determine whether a document identification associated with the chat group identification is stored in the preset storage region, and determine a document identification to be transmitted based on the determination result.

When receiving the first acquisition request, the server may determine a corresponding document identification based on storage condition in the preset storage region. The storage condition herein includes stored and un-stored, as well as a document identification corresponding to the chat group identification when storing.

In substep 202, the server is instructed to transmit the document identification, if it is determined that the document identification associated with the chat group identification exists in the preset storage region.

That is, if it is determined that the document identification corresponding to the chat group identification exists in the preset storage region, the server may acquire the document identification and transmit the document identification to the terminal device. In this case, once an association relationship between the chat group identification and the document identification is determined, that is, maintaining unchanged, one of the chat group identification and the document identification can be searched for quickly based on the other of the chat group identification and the document identification. For example, a database stores the chat group identification "B123" of the chat group B and the document identification "b123" of the online document b. If the first acquisition request includes the chat group identification "B123", the server searches the database for the document identification "b123" associated with the chat group identification "B123", thereby determining that the document identification associated with the chat group identification "B123" exists in the preset storage region, and thus transmitting the document identification "b123" to the terminal device.

In some optional embodiments, step 1011 may further include substep 203: instructing the server to create an online document if it is determined that no document identification associated with the chat group identification exists in the preset storage region, generate a document identification of the online document, and store the document identification and the chat group identification in an association manner in the preset storage region; and transmitting the generated document identification.

That is, if no document identification corresponding to the chat group identification is found in the preset storage region, it may be considered that a corresponding online document is not created for the chat group. Then, an online document is created for the chat group to record corresponding announcement information. For example, if the server finds no document identification corresponding to the chat group identification "C123" of the chat group C in the database, or the identification "C123" does not exist in the database, it may be considered that a corresponding online document c is not created for the chat group C. Then, the server may create the online document c, and generate a document identification "c123" of the document c. The server transmits the document identification "c123" to the terminal device.

After the server creates the online document and generates the corresponding document identification, the server may store the document identification and the chat group identification in an association manner in the preset storage region. In this case, the server can find the corresponding document identification in the preset storage region when receiving the first acquisition request next time, and thus acquires the corresponding online document and transmits the online document to the terminal device.

In some optional embodiments, before step 201, the information processing method may further include substep 200: instructing the server to determine whether the user is a chat group member of the chat group; instructing, if it is determined that the user is a chat group member of the chat group, the server to determine whether a document identification associated with the chat group identification is stored in the preset storage region, and determining a document identification to be transmitted based on the determination result.

That is, before substep 201, the server may determine whether the user acquiring the announcement information is the chat group member of the chat group. When it is determined that the user is the chat group member, the sever transmits a corresponding document identification to a terminal device of the user. In creating the chat group, user identifiers of the users in the chat group may be recorded. It is determined whether the user is a chat group member according to a correspondence between the user identifier and the chat group identification. For example, the chat group members of the chat group A include ZHANG San, LI Si and WANG Wu, the chat group identification of the chat group A is "A123", the user identifier of ZHANG San is "A1", the user identifier of LI Si is "A2", and the user identifier of WANG Wu is "A3". When the first acquisition request is received, it may be determined whether a user identifier of the user transmitting the first acquisition request is "A1", "A2" or "A3". In a case that it is determined that the user identifier is one of "A1", "A2" and "A3", step 201 is performed, and the determined document identification is transmitted to the terminal device of the user. In a case that it is determined that the user identifier is not "A1", "A2" or "A3", step 201 may not be performed, thereby preventing a non-chat group member from acquiring the announcement information, and thus preventing attack from others.

In some application scenarios, when the document identification is stored in the terminal device, the user may acquire the document identification. It is determined whether the user is a chat group member. In a case that it is determined that the user is the chat group member, a corresponding online document is transmitted to the user. Therefore, even if the non-chat group member acquires the document identification, the server does not transmit the corresponding online document when the server determines that the user is not the chat group member, thereby preventing leakage of the announcement information in the online document.

In some optional embodiments, step 102 may include: transmitting a document identification to the server, and instructing the server to transmit an online document indicated by the document identification.

The terminal device may transmit the acquired document identification to the server, to acquire a corresponding online document. After receiving the document identification, the server may search for the corresponding online document based on the document identification. For example, the document identification of the online document c is "c123". When the document identification "c123" is received, the online document c may be found. The online document c is transmitted to the terminal device.

In some optional embodiments, the information processing method may further include: in response to an instruction of the user, performing the following operations (1) to (4) in the announcement information.

In operation (1), in response to an instruction for inserting a super link of a first document in the announcement information from the user, a name of the first document corresponding to the super link is acquired, and the super link is edited into name information of the first document.

The first document may include a document in other application programs included in the suite, for example. For example, a chat application program and an office application program included in the same suite may share a same account system. User actions may be associated by an account. If the announcement information is located in the chat application program, the first document may be located in the office application program, and the user may insert the first document into the announcement information.

In some application scenarios, the application programs in the same suite may be provided with corresponding domain names, such as abc.com and xxx.cn. Recognition may be performed according to corresponding super links between different application programs, and the name of the first document corresponding to the super link is acquired. For example, the first document A in the office application program has a domain name abc.com. When the first document A is inserted into the online document where the announcement information is located, the chat application program where the announcement information is located may recognize the super link, and acquires the name of the first document A according to the super link.

When the name of the first document is acquired, the name is used to replace the super link and is recorded in the online document. For example, the name of the first document A is "work summary" When the user inserts the super link of the first document A, the super link may not be recorded, and the name of "work summary" is recorded. In some application scenarios, when the user clicks the name, a display interface of the first document A may be jumped to, so that the user can browse the first document A.

In operation (2), in response to an instruction for inserting a table in the announcement information from the user, a table is inserted into the announcement information.

When the announcement information is recorded by the online document, table information may be inserted into the online document, thereby processing the announcement information more conveniently. For example, in a case that the announcement information is team staff information, the staff information may be recorded by using a table and the table is inserted into the online document. In this case, both the person editing the table and the person viewing the table can browse or check the table quickly and in order.

In operation (3), in response to an instruction for editing a word format of the announcement information transmitted from the user, a word format of the announcement information is edited.

When the announcement information is recorded by the online document, words recorded in the online document may be edited. For example, thickening, labeling or grading may be performed on words. Specifically, thickening or labeling may be performed on announcement content to be emphasized; and grading may be performed on announcement content to be graded.

In operation (4), in response to an instruction for transmitting prompt information to a target user set in the announcement information by the user, prompt information is transmitted to the target user.

When the announcement information is recorded by the online document, a target user to whom prompt information is to be transmitted may be set in the online document, to prompt the target user of a certain event. For example, in response to an instruction of transmitting prompt information of "file a work schedule on Friday" to ZHANG San set in the online document, the prompt information is transmitted to ZHANG San.

In some application scenarios, a special symbol may be inserted into the online document, to represent the instruction for transmitting the prompt information to the target user. For example, "file a work schedule on Friday @ZHANG San" may be used to represent the prompt information "file a work schedule on Friday" to be transmitted to ZHANG San.

When the announcement information is recorded by the online document, functions of the online document, such as inserting a super link, inserting table information, editing a word format and prompting user, may be applied to a chat group announcement, thereby being convenient to collect and collate the announcement information by the user, and thus improving the user experience.

Figure 3:
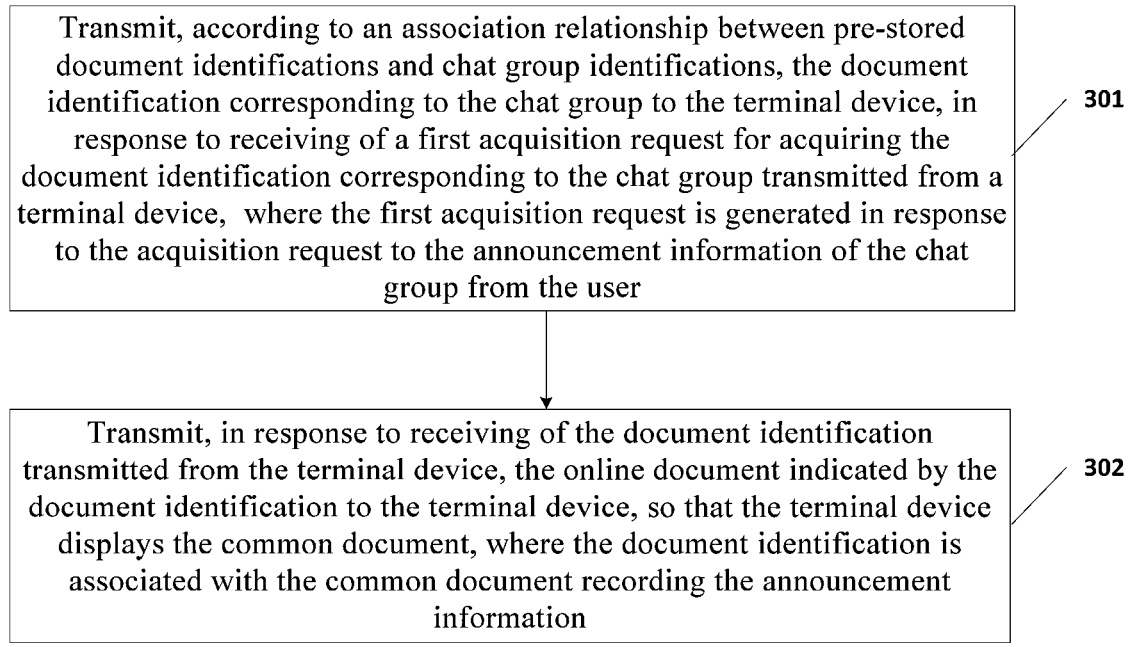
FIG. 3 is a flowchart of an information processing method according to another embodiment of the present disclosure.

Reference is made to FIG. 3 which is a flowchart of an information processing method according to an embodiment of the present disclosure. The method is applied to a server. As shown in FIG. 3, the information processing method may include the following steps 301 and 302.

In step 301, in response to receiving of a first acquisition request for acquiring a document identification corresponding to a chat group transmitted from a terminal device, the document identification corresponding to the chat group is transmitted to the terminal device according to an association relationship between pre-stored document identifications and chat group identifications. The first acquisition request is generated in response the acquisition request to the announcement information of the chat group from the user.

When the server creates an online document for a chat group, the server may generate a document identification of the online document, and may store a chat group identification of the chat group and the document identification in an association manner. When the first acquisition request is received, an associated document identification may be found according to the chat group identification in the first acquisition request, and the document identification may be transmitted to the terminal device transmitting the first acquisition request.

In step 302, in response to receiving of the document identification transmitted by the terminal device, the online document indicated by the document identification is transmitted to the terminal device, so that the terminal device displays the online document. The document identification is associated with the online document recording the announcement information.

When the terminal device needs to acquire the online document, the corresponding online document may be acquired from the server according to the acquired document identification. When the server found the corresponding online document according to the document identification, the server may transmit the online document to the terminal device. The terminal device may display the online document to the user after receiving the online document.

For implementation details of steps 301 and 302, one may refer to related illustration in steps 101 and 102. For conciseness of the specification, details are not provided herein.

The online document may be a cloud document.

In some optional embodiments, the process of determining an association relationship between document identifications and chat group identifications includes: in response to receiving of a document creation request for creating an online document for the chat group which is generated by the terminal device in response to a chat group creation request for creating a chat group, creating an online document corresponding to the chat group, generating a document identification indicating the online document, and storing the document identification and the chat group identification in an association manner in a preset storage region.

That is, when the server receives the document creation request, the server may create the chat group identification corresponding to the chat group, the online document, and generate the document identification indicating the online document. The server stores the chat group identification and the document identification in an association manner in the preset storage region. In this case, when one of the chat group identification and the document identification transmitted by the terminal device is received, the other of the chat group identification and the document identification can be found according to the association relationship. The terminal device is retuned to according to the acquisition request of the terminal device. The server may store multiple chat groups of associated chat group identifications and document identifications, to respond to the acquisition request of multiple terminal devices. For the implementation details, one may refer to related illustration in step 100. For conciseness of the specification, details are not provided herein.

In some optional embodiments, the process of determining an association relationship between the document identifications and the chat group identifications includes: in response to receiving of a document creation request for creating an online document for the chat group which is generated by the terminal device in response to a creating request to the announcement information from a chat group member of the chat group, creating an online document corresponding to the chat group, generating a document identification indicating the online document, and storing the document identification and the chat group identification in an association manner in the preset storage region.

The server may create the online document when the request for recording the announcement information from the chat group member is received for the first time, thereby avoiding storing an empty online document, and thus saving the memory space. The server may also store multiple chat groups of associated chat group identifications and document identifications, to respond to the acquisition requests of multiple terminal devices. For the implementation details, one may refer to related illustration of step 100'. For conciseness of the specification, details are not provided herein.

In some optional embodiments, the process of transmitting a document identification corresponding to the chat group according to an association relationship between pre-stored document identifications and chat group identifications in step 301 includes: substep 3011, determining whether a document identification associated with the chat group identification is stored in the preset storage region, and transmitting the document identification corresponding to the chat group according to the determination result;

and substep 3012, transmitting the document identification if it is determined that the document identification associated with the chat group identification exists in the preset storage region.

In some optional embodiments, step 301 may further include substep 3013, if it is determined that no document identification associated with the chat group identification exists in the preset storage region, creating an online document, generating a document identification of the online document, and transmitting the generated document identification; and storing the document identification and the chat group identification in an association manner in the preset storage region.

For implementation details of substeps 3011 to 3013, one may refer to related illustration of substeps 201 to 203. For conciseness of the specification, details are not provided herein.

In some optional embodiments, before the process of transmitting the document identification corresponding to the chat group according to the association relationship between pre-stored document identifications and chat group identifications, the information processing method may further include substep 3000: determining whether the user is a chat group member of the chat group; and transmitting, if it is determined that the user is the chat group member of the chat group, the document identification corresponding to the chat group according to the association relationship between the pre-stored document identifications and chat group identifications. For implementation details of substep 3000, one may refer to related illustration of step 200. For conciseness of the specification, details are not provided herein.

In some optional embodiments, the information processing method further includes: transmitting shielding information for instructing to shield a portal for sharing the announcement information of the chat group to the terminal device, so that the terminal device shields the portal for sharing in a display interface of the announcement information of the chat group.

The shielding of the portal for sharing includes: not displaying the portal for sharing in the display interface of the announcement information of the chat group, or setting the portal for sharing to be unavailable currently.

In this way, the user is prevented from transmitting the announcement information of the chat group to non-chat group members, thereby preventing leakage of the announcement information of the chat group.

In some optional embodiments, the information processing method further includes: transmitting user information of another user who is browsing/editing the online document to the terminal device, so that the terminal device displays the user information of another user when displaying the online document.

The user and the another user are chat group members of the chat group corresponding to the announcement information.

In some optional embodiments, the user may see other user who is browsing/editing the online document currently. In an aspect, a conflict due to editing the same content by different users simultaneously can be avoided. In another aspect, user information of users in the chat group can be seen, thereby feeling working in a same office.

In some optional embodiments, step 301 may further include: in response to receiving of the first acquisition request, determining whether the first acquisition request is transmitted by a chat group corresponding to the chat group announcement information; if the determination result is positive, transmitting the document identification corresponding to the chat group to the terminal device according to the association relationship between pre-stored document identifications and chat group identifications; and if the determination result is negative, transmitting prompt information indicating a portal error to the terminal device.

In some optional embodiments, when the first acquisition request for acquiring the document identification corresponding to the chat group transmitted by the terminal device is received, it can be determined whether the first acquisition request is transmitted from a chat group corresponding to the chat group announcement information, according to dialogue information carried in the first acquisition request (including a chat group name or a contact name).

If the determination result is positive, in response to the first acquisition request, a corresponding document identification is determined according to the association relationship between pre-stored document identifications and chat group identifications. Then, the document identification corresponding to the chat group is transmitted to the terminal device.

If the determination result is positive, no document identification is determined. Error prompt information may be transmitted to the terminal device.

In this way, the chat group announcement information can be prevented from being leaked.

Figure 4:
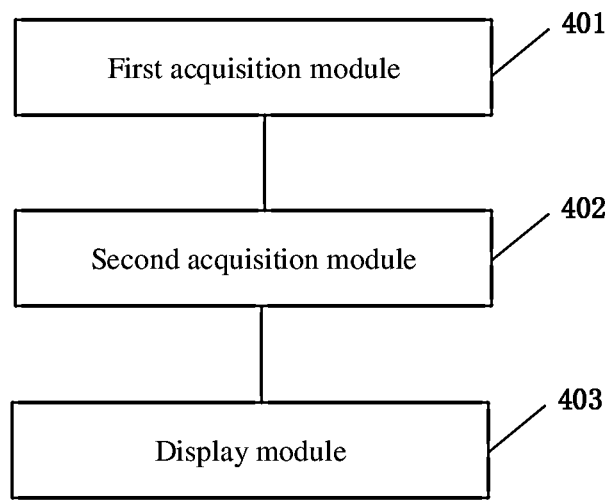
FIG. 4 is a schematic structural diagram of an information processing apparatus according to an embodiment of the present disclosure.

Reference is made to FIG. 4 which is a schematic structural diagram of an information processing apparatus according of an embodiment of the present disclosure. As shown in FIG. 4, the information processing apparatus incudes: a first acquisition module 401, a second acquisition module 402 and a display module 403. The first acquisition module 401 is configured to acquire, in response to receiving of an acquisition request to announcement information of a chat group transmitted from a user, a document identification corresponding to the announcement information. The document identification is associated with an online document recording the announcement information. The second acquisition module 402 is configured to acquire an online document indicated by the document identification based on the document identification. The display module 403 is configured to display the online document.

It should be noted that, for processing of the first acquisition module 401, the second acquisition module 402 and the display module 403 of the information processing apparatus and the resulting technical result, one may refer to related illustration in steps 101 to 103 in the embodiment corresponding to FIG. 1. Details are provided herein.

In some optional implementations of the embodiment, the information processing apparatus may further include a first creating module. The first creating module is configured to transmit, in response to receiving of a chat group creating request for creating a chat group, a document creating request for creating an online document to the server, to instruct the server to create an online document corresponding to the chat group, and generate a document identification indicating the online document.

In some optional implementations of the embodiment, the information processing apparatus may further include a second creating module. The second creating module is configured to transmit, in response to receiving of a request for recording announcement information from a chat group member of the chat group, a document creating request for creating an online document for the chat group to the server, to instruct the server to create an online document corresponding to the chat group, and generate a document identification indicating the online document.

In some optional implementations of the embodiment, the information processing apparatus further includes a first storage unit (not shown). The first storage unit is configured to store a chat group identification of the chat group and the document identification in an association manner in the preset storage region. In some optional implementations of the embodiment, the first acquisition module 401 is further configured to: transmit a first acquisition request for acquiring a document identification to the server, to instruct the server to acquire a document identification from a preset storage region. The first acquiring request includes a chat group identification of the chat group.

In some optional implementations of the embodiment, the first acquisition module 401 is further configured to: instruct the server to determine whether a document identification associated with the chat group identification is stored in the preset storage region, and determine a document identification to be transmitted according to a determination result; and transmit the document identification if it is determined that the document identification associated with the chat group identification exists in the preset storage region.

In some optional implementations of the embodiment, the first acquisition module 401 is further configured to: instruct the server to, if it is determined that no document identification associated with the chat group identification exists in the preset storage region, create an online document, generate a document identifier of the online document, and store the document identification and the chat group identification in an association manner in the preset storage region; and transmit the generated document identification.

In some optional implementations of the embodiment, the information processing apparatus may further include a user identification module. The user identification module is configured to: instruct the server to determine whether the user is a chat group member of the chat group; and instruct the server to determine, if it is determined that the user is a chat group member of the chat group, whether a document identification associated with the chat group identification is stored in the preset storage region; and determine a document identification to be transmitted according to the determination result.

In some optional implementations of the embodiment, the second acquisition module 402 is further configured to: transmit the document identification to the server, and instruct the server to transmit the online document indicated by the document identification.

In some optional implementations of the embodiment, the information processing apparatus may further include an execution module. The execution module is configured to execute the following operations in the announcement information in response to an instruction of the user: in response to an instruction for inserting a super link of a first document in the announcement information from the user, acquiring a name of the first document corresponding to the super link, and editing the super link into name information of the first document; in response to an instruction for inserting a table in the announcement information, inserting a table in the announcement information; in response to an instruction for editing a word format of the announcement information transmitted from the user, editing a word format of the announcement information; and/or in response to an instruction for transmitting prompt information to a target user set in the announcement information by the user, transmitting prompt information to the target user.

In some optional implementations of the embodiment, the online document is a cloud document.

In some optional implementations of the embodiment, the display module 403 is further configured to display user information of another user who is browsing/editing the online document on-line.

In some optional implementations of the embodiment, the user and the another user are chat group members of the chat group corresponding to the chat group announcement information.

In some optional implementations of the embodiment, the display module 403 is further configured to shield a portal for sharing the chat group announcement information in a display interface of the chat group announcement information.

Figure 5:
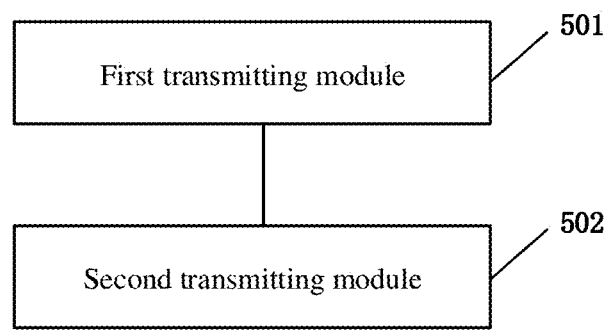
FIG. 5 is a schematic structural diagram of an information processing apparatus according to another embodiment of the present disclosure.

Reference is made to FIG. 5 which is a schematic structural diagram of an information processing apparatus according to an embodiment of the present disclosure. As shown in FIG. 5, the information processing apparatus includes a first transmitting module 501 and a second transmitting module 502. The first transmitting module 501 is configured to transmit a document identification corresponding to the chat group according to an association relationship between pre-stored document identifications and chat group identifications, in response to receiving of a first acquisition request for acquiring the document identification corresponding to the chat group which is generated by the terminal device in response to the acquisition request to the announcement information of the chat group from the user. The first acquisition request includes a chat group identification of the chat group. The second transmitting module 502 is configured to transmit an online document indicated by the document identification to the terminal device, in response to receiving of the document identification transmitted by the terminal device, so that the terminal device displays the online document. The document identification is associated with the online document recording the announcement information.

It should be noted that, for processing of the first transmitting module 501 and the second transmitting module 502 of the information processing apparatus and the resulting technical effect, one may refer to related illustration in steps 301 and 302 in the embodiment corresponding to FIG. 3. Details are not provided herein.

In some optional implementations of the embodiment, the process of determining an association relationship between the document identifications and the chat group identifications includes: in response to receiving of a document creating request for creating an online document for the chat group which is generated by the terminal device in response to a chat group creating request for creating a chat group, creating an online document corresponding to the chat group, generating a document identification indicating the online document, and storing the document identification and the chat group identification in an association manner in the preset storage region.

In some optional implementations of the embodiment, the process of determining an associated relationship between the document identifications and the chat group identifications includes: in response to receiving of a document creating request for creating an online document for the chat group which is generated by the terminal device in response to a request for recording the announcement information from a chat group member of the chat group, creating an online document corresponding to the chat group, generating a document identification indicating the online document; and storing the document identification and the chat group identification in an association manner in the preset storage region.

In some optional implementations of the embodiment, the first transmitting module 501 is further configured to: determine whether a document identification associated with the chat group identification is stored in the preset storage region, and transmit the document identification corresponding to the chat group according to a determination result; and transmitting the document identification if it is determined that the document identification associated with the chat group identification exists in the preset storage region.

In some optional implementations of the embodiment, the first transmitting module 501 is further configured to: if it is determined that no document identification associated with the chat group identification exists in the preset storage region, create an online document, generate a document identification of the online document, and transmit the generated document identification; and store the document identification and the chat group identification in an association manner in the preset storage region.

In some optional implementations of the embodiment, the information processing apparatus may further include a user identification module. The user identification module is configured to: determine whether the user is a chat group member of the chat group; and transmit, if it is determined that the user is the chat group member of the chat group, the document identification corresponding to the chat group according to an association relationship between pre-stored document identification and chat group identification.

In some optional implementations of the embodiment, the information processing apparatus may further include a storage unit (not shown). The second storage unit is configured to store the document identification and the chat group identification in an association manner in the preset storage region.

In some optional implementations of the embodiment, the online document is a cloud document.

In some optional implementations of the embodiment, the second transmitting module 502 is further configured to: transmit user information of another user who is browsing/editing the online document to the terminal device, so that the terminal device displays the user information of another user when displaying the online document.

In some optional implementations of the embodiment, the user and the another user are chat group members of a chat group corresponding to the chat group announcement information.

In some optional implementations of the embodiment, the first transmitting module 501 is further configured to: determine, in response to receiving of the first acquisition request, whether the first acquisition request is transmitted by a chat group corresponding to the chat group announcement information; if a determination result is positive, transmit a document identification corresponding to the chat group to the terminal device according to an association relationship between pre-stored document identifications and chat group identifications; and if the determination result is negative, transmit error prompt information to the terminal device.

In some optional implementations of the embodiment, the information processing apparatus further includes a shielding information transmitting module (not shown). The shielding information transmitting module is configured to: transmit shielding information for instructing to shield a portal for sharing the chat group announcement information to the terminal device, so that the terminal device shields the portal for sharing in a display interface of the chat group announcement information.

Figure 6:
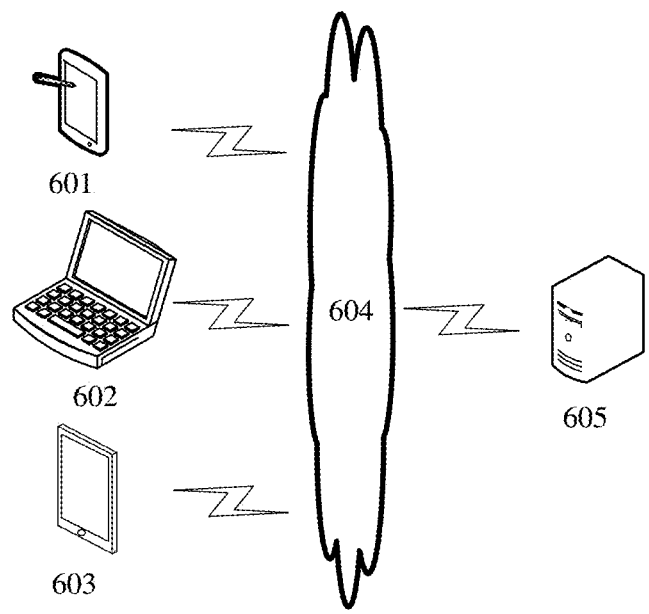
FIG. 6 is a structure of a schematic system to which the information processing method may be applied according to an embodiment of the present disclosure.

Reference is made to FIG. 6 which shows a structure of a schematic system to which the information processing method may be applied according to an embodiment of the present disclosure.

As shown in FIG. 6, the system may include terminal devices 601, 602, 603, a network 604 and a server 605. The network 604 is configured to provide medium of a communication link between the terminal devices 601, 602, 603 and the server 605. The network 604 may include a wired network, a wireless communication link or an optical fiber cable. The terminal device and the server may perform communication by using any known network protocol such as Hyper Text Transfer Protocol (HTTP) or any network protocol to be developed, and may connect with digital data in any form or carried in any medium (for example, a communication network). The communication network includes a local area network (LAN), a wide area network (WAN), an international network (for example the internet), a peer-to-peer network (for example ad hoc peer-to-peer network), and any known network or network to be developed.

The terminal device 601, 602 and 603 may interact with the server 605 over the network 604, to receive or transmit messages. The terminal devices 601, 602 and 603 may be installed with various clients, such as video releasing application, search application and news application.

The terminal devices 601, 602 and 603 may be implemented by hardware or software. In a case that the terminal devices 601, 602 and 603 are implemented as hardware, the terminal device may be an electronic device including a display screen and supporting web browsing, including but not limited to a smart mobile phone, a tablet computer, an electronic book reader, a moving picture experts group audio layer III (MP3) player, a moving picture experts group audio layer IV (MP4) player, a laptop portable computer and a desktop computer. In a case that the terminal devices 601, 602 and 603 are implemented by software, the terminal device may be installed in the electronic device listed above. The terminal device may be implemented as multiple software or software modules (for example software or software module for providing a distributed service), or may be implemented as a single software or software module. The implementations of the terminal device are not limited herein.

The server 605 may provide various services. For example, the server 605 is configured to receive an online document acquisition request transmitted from the terminal devices 601, 602 and 603, analyze the online document acquisition request and transmit the an analysis result (for example an online document corresponding to the acquisition request) to the terminal devices 601, 602 and 603.

It should be noted that, the information processing method described in the embodiments of the present disclosure may be performed by the server or the terminal device. Accordingly, the information processing apparatus may be arranged in the server or the terminal device.

It should be understood that the numbers of terminal device, network and server in FIG. 6 are only schematic. Any number of terminal device, network and server may be provided according to actual need.

Figure 7:
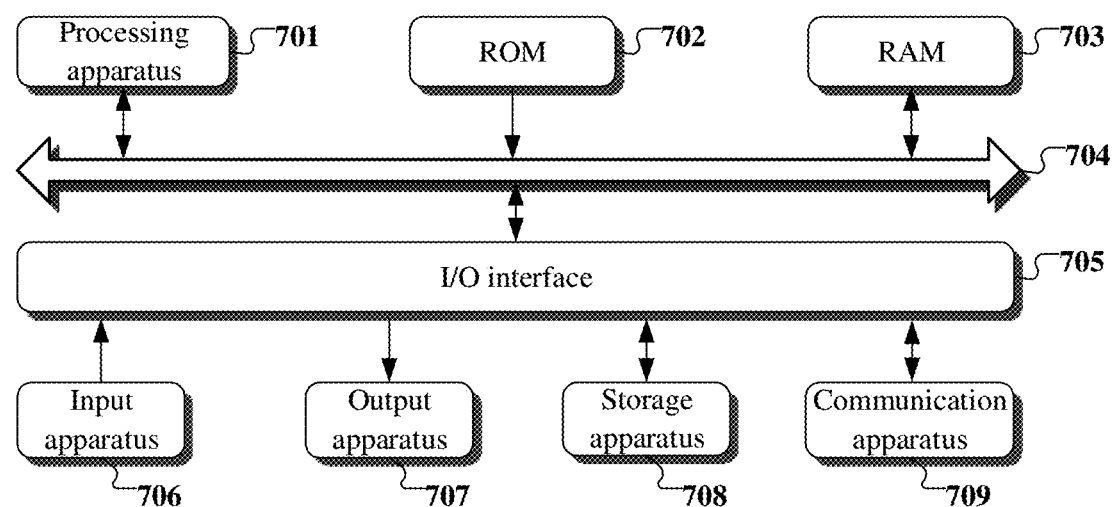
FIG. 7 is a schematic structural diagram of an electronic device according to an embodiment of the present disclosure.

Reference is made to FIG. 7 which shows a schematic structural diagram of an electronic device for implementing the embodiments of the present disclosure (the terminal device or the server shown in FIG. 6). The electronic device in FIG. 7 is schematic, and is not intended to limit the function and use scope of the embodiments of the present disclosure.

As shown in FIG. 7, the electronic device may include a processing apparatus (such as a central processor and a graphic processor) 701. The processing apparatus may perform various appropriate actions and processing by executing programs stored in a read-only memory (ROM) 702 or programs uploaded from a storage apparatus 708 to a random access memory (RAM) 703. Various programs and data required for operations of the electronic device are also stored in the RAM 703. The processing apparatus 701, the ROM 702 and the RAM 703 are connected to each other through the bus 704. An input/output (I/O) interface 705 is also connected to the bus 704.

Generally, the following components are connected to the I/O interface 705: an input apparatus 706 such as a touch screen, a touch panel, a keyboard, a mouse, a camera, a microphone, an accelerometer, and gyroscope; an output apparatus 707 such as a liquid crystal display (LCD), a loudspeaker and a vibrator; a storage apparatus 708 such as a magnetic tape and a hard disk; and a communication apparatus 709. The communication apparatus 709 may allow the electronic device to communicate with other device in a wired or wireless manner to exchange data. Although FIG. 7 shows the electronic device provided with various apparatuses, it should be understood that not all shown apparatuses are necessary. Alternatively, more or less apparatuses may be included.

According to the embodiments of the present disclosure, a process described in the flowchart may be implemented by computer software programs. For example, according to an embodiment of the present disclosure, a computer program product including computer program carried on a non-transitory computer readable medium is provided. The computer program includes program codes for performing the method shown in the flowchart. In such embodiment, the computer program may be downloaded and installed from the network through the communication apparatus 709, installed from the storage apparatus 708 or installed from the ROM 702. The computer program is executed by the processing apparatus 701 to perform functions defined in the methods described in the embodiments of the present disclosure.

It should be noted that, the computer readable medium described in the present disclosure may be a computer readable signal medium, a computer readable storage medium or any combination thereof. The computer readable storage medium may include but not limited to a system, an apparatus or a device in an electric, magnetic, optical, electromagnetic, infrared or a semiconductor form, or any combination thereof. The computer readable storage medium may include but not limited to electric connection of one or more wires, a portable computer magnetic disk, a hard disk, a random access memory (RAM), a read-only memory (ROM), an erasable programmable read only memory (EPROM or a flash memory), an optical fiber, a portable compact disk read only memory (CD-ROM), an optical storage device, a magnetic storage device or any combination thereof. In the present disclosure, the computer readable storage medium may be a tangible medium including or storing programs. The programs may be used by an instruction execution system, apparatus or device, or may be used in combination with the instruction execution system, apparatus or device. In the present disclosure, a computer readable signal medium may include a data signal in a baseband or propagated as a part of carrier. The computer readable signal medium carries computer readable program codes. The propagated data signal may include but not limited to an electromagnetic signal, an optical signal or any combination thereof. The computer readable signal medium may be any computer readable medium other than the computer readable storage medium. The computer readable signal medium may send, propagate or transmit programs used by the instruction execution system, apparatus or device or the programs used in combination with the instruction execution system, apparatus or device. The program code included in the computer readable medium may be transmitted via any appropriate medium, including but not limited to an electric wire, an optical fiber, radio frequency (RF) or any appropriate combination thereof.

The computer readable medium may be included in the electronic device described above, or may exist independently and is not installed in the electronic device.

The computer readable storage medium carries one or more programs. The one or more programs, when being executed by the electronic device, causes the electronic device to perform operations: acquiring, in response to receiving of an acquisition request to announcement information of a chat group transmitted from a user, a document identification corresponding to the announcement information, where the document identification is associated with an online document recording the announcement information; and acquiring an online document associated with the document identification based on the document identification; and displaying the online document.

Alternatively, the one or more programs, when being executed by the electronic device, cause the electronic device to perform operations: transmitting, according to an association relationship between pre-stored document identifications and chat group identifications, a document identification corresponding to the chat group to the terminal device, in response to receiving of a first acquisition request for acquiring the document identification corresponding to the chat group transmitted from a terminal device, where the first acquisition request is generated in response to the acquisition request to the announcement information of the chat group from the user and the first acquisition request includes a chat group identification of the chat group; and transmitting, in response to receiving of the document identification transmitted from the terminal device, an online document indicated by the document identification to the terminal device, so that the terminal device displays the online document. The document identification is associated with an online document recording the announcement information.

Computer program codes for performing operations of the present disclosure may be written by using one or more program design language or any combination. The program design language includes but not limited to object oriented program design language such as Java, Smalltalk and C++, and further includes conventional process-type program design language such as "C" or similar program design language. The program codes may be completely or partially executed on a user computer, performed as an independent software packet, partially executed on the user computer and partially executed on a remote computer, or completely executed on the remote computer or a server. In a case of involving the remote computer, the remote computer may connect to the user computer via any type of network such as a local area network (LAN) and a wide area network (WAN). Alternatively, the remote computer may connect to an external computer (such as achieving internet connection by services provided by the internet network service provider).

The flowcharts and block diagrams shown in the drawings show a system architecture, function and operation which may be implemented by the system, method and computer program product according to the embodiments of the present disclosure. Each block in the flowcharts or the block diagram may represent a part of a module, a program section or codes including executable instructions for implementing specified logic functions. It should be noted that, in alternative embodiment, functions denoted in the blocks may be performed in an order different from the order denoted in the drawing. For example, operations in two blocks connected successively may be performed in parallel, or may be performed in an opposite order, depending on the involved function. It should be noted that, each block in the block diagrams and/or flowcharts, and a combination of blocks in the block diagrams and/or flowcharts may be implemented by a dedicated hardware system for performing specified functions or operations, or may be implemented by a combination of dedicated hardware and computer instructions.

Modules involved in the embodiments of the present disclosure may be implemented by software or hardware. Names of the modules do not limit the modules in a certain case.

The functions described above may be partially performed by one or more hardware logic components. For example, the hardware logic components include: a field programmable gate array (FPGA), an application specific integrated circuit (ASIC), an application specific standard product (ASSP), a system on chip (SOC), a complex programmable logic device (CPLD) and so on.

It the context of the present disclosure, the computer readable medium may be a tangible medium including or storing programs. The programs may be used by an instruction execution system, apparatus or device, or may be used in combination with the instruction execution system, apparatus or device. The machine readable medium may be a machine readable signal medium or a machine readable storage medium. The machine readable storage medium may include but not limited to a system, an apparatus or a device in an electric, magnetic, optical, electromagnetic, infrared or a semiconductor form, or any combination thereof. The machine readable storage medium may include but not limited to electric connection of one or more wires, a portable computer magnetic disk, a hard disk, a random access memory (RAM), a read-only memory (ROM), an erasable programmable read only memory (EPROM or a flash memory), an optical fiber, a portable compact disk read only memory (CD-ROM), an optical storage device, a magnetic storage device or any combination thereof The preferred embodiments and the technical principles of the present disclosure are described above. It should be understood by those skilled in the art that, the protection scope of the present disclosure is not limited to the technical solutions formed by specific combination of the above technical features, and other technical solutions formed by random combinations of the above technical features or equivalent features without departing from the concept of the present disclosure also fall within the protection scope of the present disclosure, for example the technical solution formed by replacement between the above technical features and technical features with similar functions disclosed (not limited) in the present disclosure.

Although the operations are described in a specific order, the operations are unnecessarily to be performed in the specific order or in a chronological order. In a certain environment, a multi-task and parallel processing may be beneficial. Although specific details are described above, the details should not be understood as restriction to the scope of the present disclosure. Some features described in the context of different embodiments may be combined in one embodiment. Alternatively, the features described in the context of one embodiment may be implemented in multiple embodiments independently or in any appropriate sub-combination.

The subject matter is described by language specific to the structure feature and/or method logic, it should be understood that the subject matter defined in the appended claims is not limited to the specific features or actions described above. The specific features and actions are only schematic implementation of the claims.

The invention claimed is:

1. An information processing method, comprising:
acquiring, in response to receiving of an acquisition request to announcement information of a chat group transmitted from a user, a document identification corresponding to the announcement information, wherein the document identification is associated with a common document recording the announcement information;
acquiring the online document indicated by the document identification based on the document identification;
displaying the online document;
in response to an instruction from the user, performing at least one of following operations in the announcement information:
acquiring, in response to an instruction for inserting a super link of a first document in the announcement information from the user, a name of the first document corresponding to the super link, and editing the super link into name information of the first document;
inserting a table in the announcement information in response to an instruction for inserting a table in the announcement information from the user;
editing a word format of the announcement information in response to an instruction for editing a word format of the announcement information transmitted from the user; and
transmitting prompt information to a target user in response to an instruction for transmitting the prompt information to the target user set in the announcement information by the user.

2. The method according to claim 1, wherein before the acquiring, in response to receiving of an acquisition request to announcement information of a chat group transmitted from a user, a document identification corresponding to the announcement information, the method further comprises:
transmitting, in response to receiving of a chat group creation request for creating a chat group, a document creation request for creating an online document for the chat group to a server, to instruct the server to create an online document corresponding to the chat group, and generate a document identification indicating the online document.

3. The method according to claim 1, wherein before the acquiring, in response to receiving of an acquisition request to announcement information of a chat group transmitted from a user, a document identification corresponding to the announcement information, the method further comprises:
transmitting, in response to receiving of a request for recording announcement information from a chat group member of the chat group, a document creation request for creating an online document for the chat group to a server, to instruct the server to create an online document corresponding to the chat group, and generate a document identification indicating the online document.

4. The method according to claim 2, further comprising: storing, in an association manner, a chat group identification of the chat group and the document identification in a preset storage region.

5. The method according to claim 2, wherein the acquiring, in response to receiving of an acquisition request to announcement information of a chat group transmitted from a user, a document identification corresponding to the announcement information comprises:
transmitting a first acquisition request for acquiring the document identification to the server, to instruct the server to acquire the document identification from a preset storage region, wherein the first acquisition request comprises a chat group identification of the chat group.

6. The method according to claim 5, wherein the transmitting a first acquisition request for acquiring the document identification to the server, to instruct the server to acquire the document identification from a preset storage region comprises:
instructing the server to determine whether a document identification associated with the chat group identification is stored in the preset storage region, and determining a document identification to be transmitted according to a determination result; and
transmitting the document identification if it is determined that the document identification associated with the chat group identification exists in the preset storage region.

7. The method according to claim 6, wherein the transmitting a first acquisition request for acquiring the document identification to the server, to instruct the server to acquire the document identification from a preset storage region comprises:
instructing the server to create online document and generate a document identification of the online document, if it is determined that no document identification associated with the chat group identification exists in the preset storage region; and
storing, in an association manner, the document identification and the chat group identification in the preset storage region, and transmitting the generated document identification.

8. The method according to claim 6, wherein before the instructing the server to determine whether a document identification associated with the chat group identification is stored in the preset storage region and determining a document identification to be transmitted according to a determination result, the method further comprises:
instructing the server to determine whether the user is a chat group member of the chat group; and
instructing, if it is determined that the user is a member of the chat group, the server to determine whether a document identification associated with the group identification is stored in the preset storage region, and determining a document identification to be transmitted according to a determination result.

9. The method according to claim 2, wherein the acquiring the online document indicated by the document identification based on the document identification comprises:
    transmitting the document identification to the server, and instructing the server to transmit the online document indicated by the document identification.

10. The method according to claim 1, wherein the online document is a cloud document.

11. The method according to claim 1, further comprising: displaying user information of another user who is browsing/editing the online document on-line.

12. The method according to claim 11, wherein the user and the another user are group members of the chat group corresponding to the announcement information.

13. The method according to claim 1, further comprising: shielding a portal for sharing the announcement information of the chat group in a display interface of the announcement information of the chat group.

14. An information processing method, comprising:
    transmitting, according to an association relationship between pre-stored document identifications and chat group identifications, a document identification corresponding to a chat group to a terminal device, in response to receiving of a first acquisition request for acquiring the document identification corresponding to the chat group transmitted from the terminal device, wherein the first acquisition request is generated in response to an acquisition request to announcement information of the chat group from a user, and the first acquisition request comprises the chat group identification of the chat group;
    transmitting, in response to receiving of the document identification transmitted from the terminal device, an online document indicated by the document identification to the terminal device, so that the terminal device displays the online document, wherein the document identification is associated with the online document recording the announcement information; and
    transmitting user information of another user who is browsing/editing the online document to the terminal device, so that the terminal device displays the user information of the another user when displaying the online document,
    wherein the transmitting, according to an association relationship between pre-stored document identifications and chat group identifications, a document identification corresponding to a chat group to a terminal device, in response to receiving of a first acquisition request for acquiring the document identification corresponding to the chat group transmitted from the terminal device comprises:
    determining, in response to receiving of the first acquisition request, whether the first acquisition request is transmitted from a chat group corresponding to the announcement information;
    transmitting, if a determination result is positive, a document identification corresponding to the chat group to the terminal device according to the association relationship between the pre-stored document identifications and chat group identifications; and
    transmitting error prompt information to the terminal device if the determination result is negative.

15. The method according to claim 14, wherein determining the association relationship between the document identification and the chat group identification comprises:
    creating an online document corresponding to the chat group and generating a document identification indicating the online document, in response to receiving of a document creation request for creating the online document for the chat group which is generated by the terminal device in response to a chat group creation request for creating a chat group.

16. The method according to claim 14, wherein determining the association relationship between the document identification and the chat group identification comprises:
    creating an online document corresponding to the chat group and generating a document identification indicating the online document, in response to receiving of a document creation request for creating the online document for the chat group which is generated by the terminal device in response to a request for recording the announcement information from a chat group member of the chat group.

17. The method according to claim 15, wherein the document identification and the chat group identification are stored in an association manner in a preset storage region.

18. The method according to claim 17, wherein the transmitting a document identification corresponding to the chat group according to an association relationship between pre-stored document identifications and chat group identifications comprises:
    determining whether a document identification associated with the chat group identification is stored in the preset storage region, and transmitting a document identification corresponding to the chat group according to a determination result; and
    transmitting the document identification if it is determined that the document identification associated with the chat group identification exists in the preset storage region.

19. The method according to claim 18, wherein the transmitting a document identification corresponding to the chat group according to an association relationship between pre-stored document identifications and chat group identifications further comprises:
    creating an online document and generating a document identification of the online document, if it is determined that no document identification associated with the chat group identification exists in the preset storage region;
    transmitting the generated document identification; and
    storing, in an association manner, the document identification and the chat group identification in the preset storage region.

20. The method according to claim 18, wherein before the transmitting a document identification corresponding to the chat group according to an association relationship between pre-stored document identifications and chat group identification, the method further comprises:
    determining whether user is a chat group member of the chat group; and
    transmitting, if it is determined that the user is a chat group member of the chat group, a document identification corresponding to the chat group according to the association relationship between pre-stored document identifications and chat group identifications.

21. The method according to claim 14, wherein the online document is a cloud document.

22. The method according to claim 14, wherein the user and the another user are chat group members of the chat group corresponding to the announcement information.

23. The method according to claim 14, further comprising: transmitting shielding information for instructing to shield a portal for sharing the announcement information of the chat group to the terminal device, so that the terminal device shields the portal for sharing in a display interface of the announcement information of the chat group.

24. An electronic device, comprising:
one or more processors; and
a storage apparatus storing one or more programs, wherein the one or more programs, when being executed by the one or more processors, cause the one or more processors to implement the method according to claim 1.

25. An electronic device, comprising:
one or more processors; and
a storage apparatus storing one or more programs, wherein the one or more programs, when being executed by the one or more processors, cause the one or more processors to implement the method according to claim 14.

26. A non-transitory computer readable medium storing a computer program, wherein the program is executed by a processor to implement the method according to claim 1.

27. A non-transitory computer readable medium storing a computer program, wherein the program is executed by a processor to implement the method according to claim 14.

* * * * *